(12) United States Patent
Iwashita et al.

(10) Patent No.: US 9,500,840 B2
(45) Date of Patent: Nov. 22, 2016

(54) ZOOM LENS SYSTEM, IMAGING DEVICE AND CAMERA

(71) Applicant: Panasonic Intellectual Property Management Co., Ltd., Osaka (JP)

(72) Inventors: Tsutomu Iwashita, Osaka (JP); Yoshiaki Kurioka, Osaka (JP); Takehiro Nishioka, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/595,586

(22) Filed: Jan. 13, 2015

(65) Prior Publication Data

US 2015/0124127 A1    May 7, 2015

Related U.S. Application Data

(63) Continuation of application No. PCT/JP2013/002573, filed on Apr. 16, 2013.

(30) Foreign Application Priority Data

Jul. 17, 2012    (JP) .................. 2012-158712

(51) Int. Cl.
*G02B 15/14* (2006.01)
*G02B 13/00* (2006.01)
(Continued)

(52) U.S. Cl.
CPC ............. *G02B 13/009* (2013.01); *G02B 15/14* (2013.01); *G02B 15/16* (2013.01); *G02B 15/173* (2013.01); *H04N 5/23296* (2013.01)

(58) Field of Classification Search
CPC ...... G02B 15/00; G02B 15/14; G02B 15/15; G02B 15/16; G02B 15/163; G02B 15/167; G02B 15/173; G02B 15/20; G02B 15/24; G02B 15/28; G02B 13/00; G02B 13/001; G02B 13/0015; G02B 13/009
See application file for complete search history.

(56) References Cited

U.S. PATENT DOCUMENTS 5,691,851 A    11/1997  Nishio et al.
6,061,186 A *  5/2000   Nishio ................. G02B 15/173
                                                          359/683

(Continued)

FOREIGN PATENT DOCUMENTS

JP    05-224125    9/1993
JP    07-049453    2/1995
(Continued)

OTHER PUBLICATIONS

International Search Report issued Jul. 9, 2013 in International (PCT) Application No. PCT/JP2013/002573.

*Primary Examiner* — Thong Nguyen
(74) *Attorney, Agent, or Firm* — Wenderoth, Lind & Ponack, L.L.P.

(57) ABSTRACT

A zoom lens system comprising a plurality of lens units each being composed of at least one lens element, and comprising, in order from an object side to an image side, a first lens unit having positive optical power, a second lens unit having negative optical power, a third lens unit having positive optical power, a fourth lens unit having positive optical power, and a fifth lens unit having negative optical power, wherein the first lens unit is composed of two or less lens elements, the third lens unit is composed of five or more lens elements, and the condition: $5.0 < f_1/f_3 < 8.0$ ($f_1$: a focal length of the first lens unit, $f_3$: a focal length of the third lens unit) is satisfied.

10 Claims, 10 Drawing Sheets

(51) Int. Cl.
    *G02B 15/173* (2006.01)
    *G02B 15/16* (2006.01)
    *H04N 5/232* (2006.01)

(56) References Cited

U.S. PATENT DOCUMENTS

| | | | |
|---|---|---|---|
| 7,417,801 B2 * | 8/2008 | Nakatani | G02B 27/646 |
| | | | 359/686 |
| 7,649,693 B2 * | 1/2010 | Kuroda | G02B 15/173 |
| | | | 359/432 |
| 2007/0229985 A1 | 10/2007 | Nakatani et al. | |
| 2008/0007841 A1 | 1/2008 | Souma et al. | |
| 2008/0218875 A1 * | 9/2008 | Kuroda | G02B 15/173 |
| | | | 359/684 |
| 2008/0259464 A1 | 10/2008 | Kuroda et al. | |
| 2008/0309798 A1 | 12/2008 | Sueyoshi et al. | |
| 2011/0102905 A1 | 5/2011 | Harada | |
| 2013/0169846 A1 * | 7/2013 | Yanai | G02B 15/14 |
| | | | 348/240.1 |
| 2013/0242171 A1 * | 9/2013 | Kurioka | G02B 13/009 |
| | | | 348/345 |

FOREIGN PATENT DOCUMENTS

| | | |
|---|---|---|
| JP | 10-206736 | 8/1998 |
| JP | 2006-251468 | 9/2006 |
| JP | 2007-264173 | 10/2007 |
| JP | 2008-040485 | 2/2008 |
| JP | 2011-90190 | 5/2011 |
| JP | 2011-099924 | 5/2011 |
| JP | 2011-099925 | 5/2011 |
| JP | 2012-133116 | 7/2012 |
| WO | 2006/095544 | 9/2006 |

\* cited by examiner

ZOOM LENS SYSTEM, IMAGING DEVICE AND CAMERA

RELATED APPLICATIONS

This application is a Continuation of International Application No. PCT/JP2013/002573, filed on Apr. 16, 2013, which in turn claims the benefit of Japanese Application No. 2012-158712, filed on Jul. 17, 2012, the disclosures of which Applications are incorporated by reference herein.

BACKGROUND

Field

The present disclosure relates to zoom lens systems, imaging devices, and cameras.

Description of the Related Art

Size reduction and performance improvement are strongly required of cameras having image sensors performing photoelectric conversion, such as digital still cameras and digital video cameras (simply referred to as digital cameras, hereinafter).

Japanese Laid-Open Patent Publications Nos. 2011-099924 and 2011-099925 each disclose a variable magnification optical system which includes a first lens unit having positive refractive power, a second lens unit having negative refractive power, and subsequent lens units including at least a third lens unit having positive refractive power at a position closest to the object side. In zooming, the interval between the first lens unit and the second lens unit increases, and the interval between the second lens unit and the subsequent lens units decreases.

SUMMARY

The present disclosure provides a high-resolution and high-performance zoom lens system in which occurrences of various aberrations are sufficiently suppressed. Further, the present disclosure provides an imaging device including the zoom lens system, and a compact camera including the imaging device.

(I) The novel concepts disclosed herein were achieved in order to solve the foregoing problems in the related art, and herein is disclosed:

a zoom lens system comprising a plurality of lens units each being composed of at least one lens element, the zoom lens system, in order from an object side to an image side, comprising:

a first lens unit having positive optical power;
a second lens unit having negative optical power;
a third lens unit having positive optical power;
a fourth lens unit having positive optical power; and
a fifth lens unit having negative optical power, wherein
the first lens unit is composed of two or less lens elements,
the third lens unit is composed of five or more lens elements, and
the following condition (1) is satisfied:

$$5.0 < f_1/f_3 < 8.0 \tag{1}$$

where
$f_1$ is a focal length of the first lens unit, and
$f_3$ is a focal length of the third lens unit.

The novel concepts disclosed herein were achieved in order to solve the foregoing problems in the related art, and herein is disclosed:

an imaging device capable of outputting an optical image of an object as an electric image signal, comprising:

a zoom lens system that forms the optical image of the object; and an image sensor that converts the optical image formed by the zoom lens system into the electric image signal, wherein the zoom lens system is a zoom lens system comprising a plurality of lens units each being composed of at least one lens element, the zoom lens system, in order from an object side to an image side, comprising:

a first lens unit having positive optical power;
a second lens unit having negative optical power;
a third lens unit having positive optical power;
a fourth lens unit having positive optical power; and
a fifth lens unit having negative optical power, wherein
the first lens unit is composed of two or less lens elements,
the third lens unit is composed of five or more lens elements, and
the following condition (1) is satisfied:

$$5.0 < f_1/f_3 < 8.0 \tag{1}$$

where
$f_1$ is a focal length of the first lens unit, and
$f_3$ is a focal length of the third lens unit.

The novel concepts disclosed herein were achieved in order to solve the foregoing problems in the related art, and herein is disclosed:

a camera for converting an optical image of an object into an electric image signal and then performing at least one of displaying and storing of the converted image signal, comprising:

an imaging device including a zoom lens system that forms the optical image of the object, and an image sensor that converts the optical image formed by the zoom lens system into the electric image signal, wherein the zoom lens system is a zoom lens system comprising a plurality of lens units each being composed of at least one lens element, the zoom lens system, in order from an object side to an image side, comprising:

a first lens unit having positive optical power;
a second lens unit having negative optical power;
a third lens unit having positive optical power;
a fourth lens unit having positive optical power; and
a fifth lens unit having negative optical power, wherein
the first lens unit is composed of two or less lens elements,
the third lens unit is composed of five or more lens elements, and
the following condition (1) is satisfied:

$$5.0 < f_1/f_3 < 8.0 \tag{1}$$

where
$f_1$ is a focal length of the first lens unit, and
$f_3$ is a focal length of the third lens unit.

(II) The novel concepts disclosed herein were achieved in order to solve the foregoing problems in the related art, and herein is disclosed:

a zoom lens system comprising a plurality of lens units each being composed of at least one lens element, the zoom lens system, in order from an object side to an image side, comprising:

a first lens unit having positive optical power;
a second lens unit having negative optical power;
a third lens unit having positive optical power;
a fourth lens unit having positive optical power; and
a fifth lens unit having negative optical power, wherein
the first lens unit is composed of two or less lens elements, the third lens unit is composed of at least two lens elements, and an aperture diaphragm is placed between two lens elements among the lens elements constituting the third lens unit, and the following condition (1) is satisfied:

$$5.0 < f_1/f_3 < 8.0 \tag{1}$$

where $f_1$ is a focal length of the first lens unit, and
$f_3$ is a focal length of the third lens unit.

The novel concepts disclosed herein were achieved in order to solve the foregoing problems in the related art, and herein is disclosed:

an imaging device capable of outputting an optical image of an object as an electric image signal, comprising:

a zoom lens system that forms the optical image of the object; and an image sensor that converts the optical image formed by the zoom lens system into the electric image signal, wherein the zoom lens system is a zoom lens system comprising a plurality of lens units each being composed of at least one lens element, the zoom lens system, in order from an object side to an image side, comprising:

a first lens unit having positive optical power;
a second lens unit having negative optical power;
a third lens unit having positive optical power;
a fourth lens unit having positive optical power; and
a fifth lens unit having negative optical power, wherein
the first lens unit is composed of two or less lens elements,
the third lens unit is composed of at least two lens elements, and an aperture diaphragm is placed between two lens elements among the lens elements constituting the third lens unit, and the following condition (1) is satisfied:

$$5.0 < f_1/f_3 < 8.0 \tag{1}$$

where $f_1$ is a focal length of the first lens unit, and
$f_3$ is a focal length of the third lens unit.

The novel concepts disclosed herein were achieved in order to solve the foregoing problems in the related art, and herein is disclosed:

a camera for converting an optical image of an object into an electric image signal and then performing at least one of displaying and storing of the converted image signal, comprising:

an imaging device including a zoom lens system that forms the optical image of the object, and an image sensor that converts the optical image formed by the zoom lens system into the electric image signal, wherein the zoom lens system is a zoom lens system comprising a plurality of lens units each being composed of at least one lens element, the zoom lens system, in order from an object side to an image side, comprising:

a first lens unit having positive optical power;
a second lens unit having negative optical power;
a third lens unit having positive optical power;
a fourth lens unit having positive optical power; and
a fifth lens unit having negative optical power, wherein
the first lens unit is composed of two or less lens elements,
the third lens unit is composed of at least two lens elements, and an aperture diaphragm is placed between two lens elements among the lens elements constituting the third lens unit, and the following condition (1) is satisfied:

$$5.0 < f_1/f_3 < 8.0 \tag{1}$$

where $f_1$ is a focal length of the first lens unit, and
$f_3$ is a focal length of the third lens unit.

The zoom lens system according to the present disclosure sufficiently suppresses occurrences of various aberrations, and has high resolution and high performance.

BRIEF DESCRIPTION OF THE DRAWINGS

This and other objects and features of the present disclosure will become clear from the following description, taken in conjunction with the exemplary embodiments with reference to the accompanied drawings in which.

DETAILED DESCRIPTION

Hereinafter, embodiments will be described with reference to the drawings as appropriate. However, descriptions more detailed than necessary may be omitted. For example, detailed description of already well known matters or description of substantially identical configurations may be omitted. This is intended to avoid redundancy in the description below, and to facilitate understanding of those skilled in the art.

It should be noted that the applicants provide the attached drawings and the following description so that those skilled in the art can fully understand this disclosure. Therefore, the drawings and description are not intended to limit the subject defined by the claims.

Embodiments 1 to 3

Figure 1:
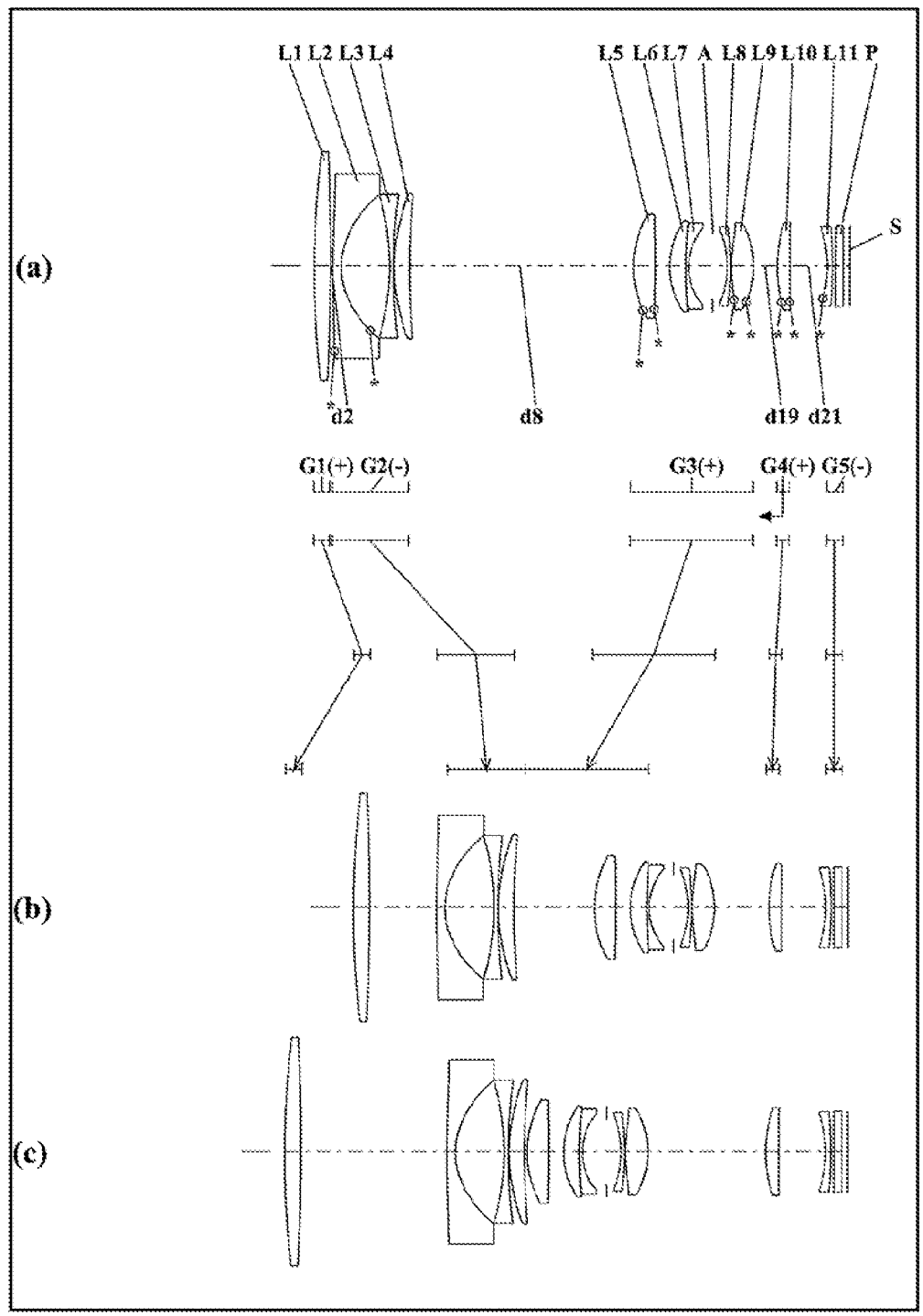
FIG. 1 is a lens arrangement diagram showing an infinity in-focus condition of a zoom lens system according to Embodiment 1 (Numerical Example 1)
Figure 4:
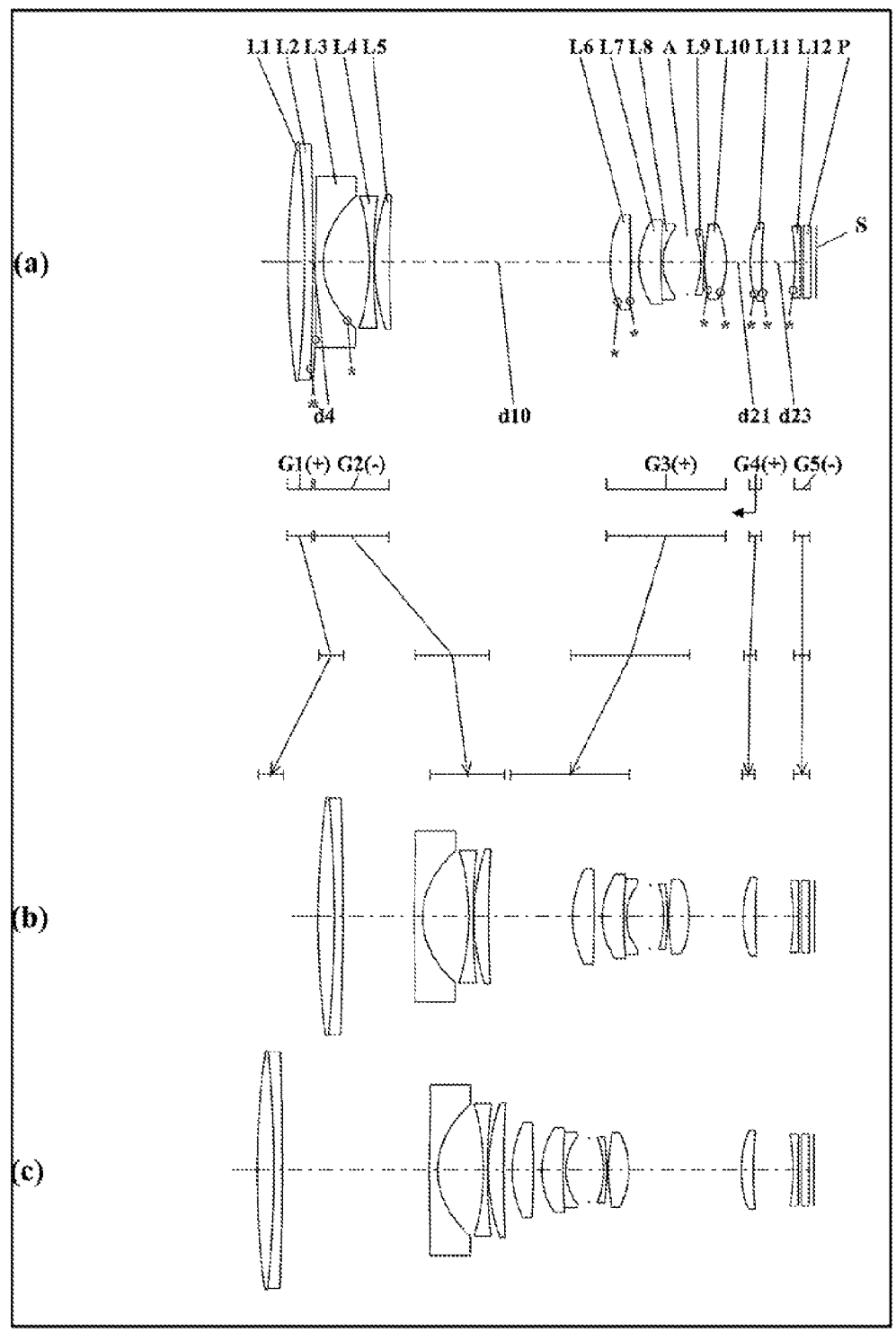
FIG. 4 is a lens arrangement diagram showing an infinity in-focus condition of a zoom lens system according to Embodiment 2 (Numerical Example 2)
Figure 7:
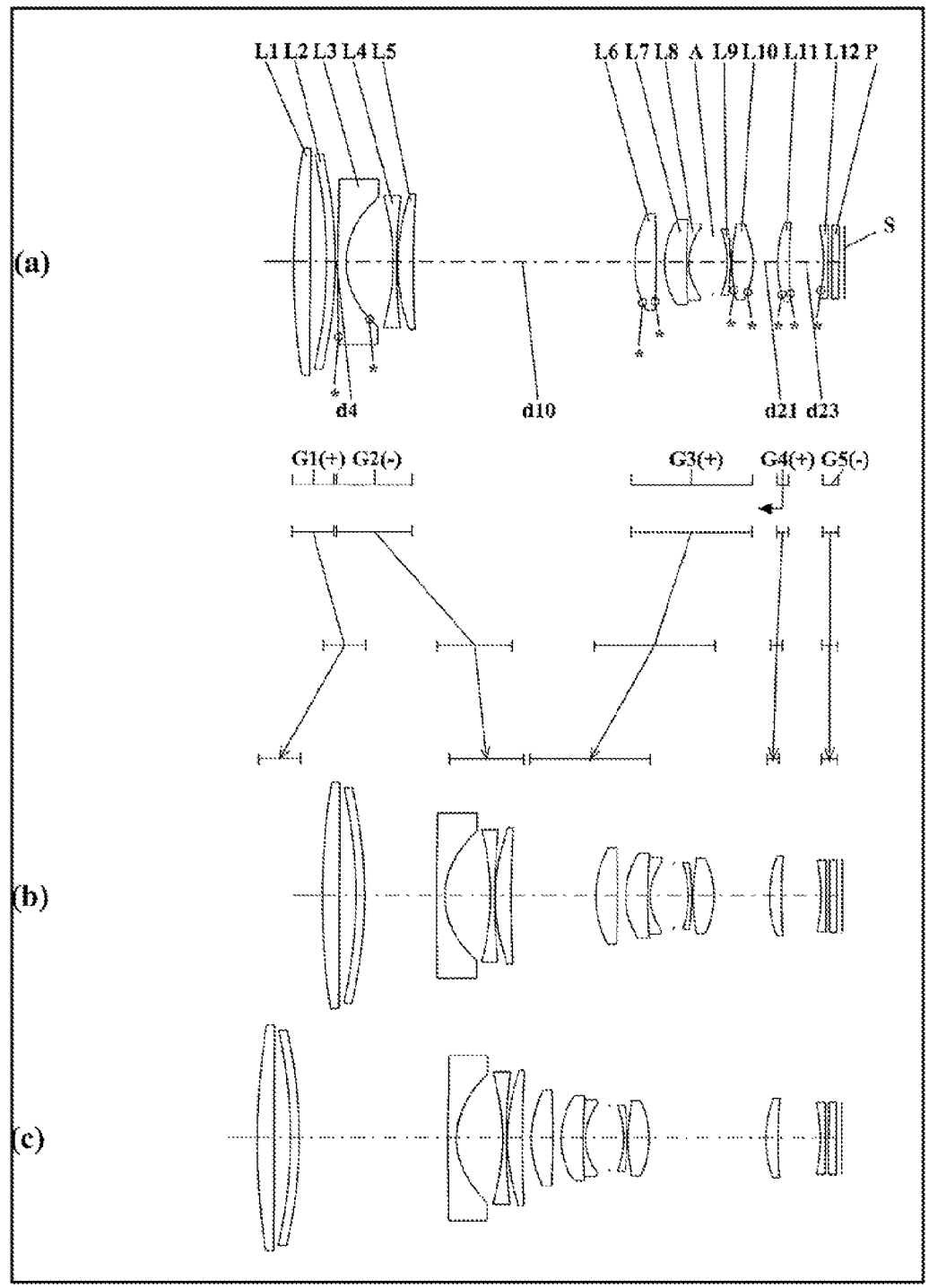
FIG. 7 is a lens arrangement diagram showing an infinity in-focus condition of a zoom lens system according to Embodiment 3 (Numerical Example 3)

FIGS. 1, 4 and 7 are lens arrangement diagrams of zoom lens systems according to Embodiments 1 to 3, respectively. Each zoom lens system is in an infinity in-focus condition.

In each Fig., part (a) shows a lens configuration at a wide-angle limit (in the minimum focal length condition: focal length $f_W$), part (b) shows a lens configuration at a middle position (in an intermediate focal length condition: focal length $f_M = \sqrt{(f_W * f_T)}$), and part (c) shows a lens configuration at a telephoto limit (in the maximum focal length condition: focal length $f_T$). Further, in each Fig., each bent arrow located between part (a) and part (b) indicates a line obtained by connecting the positions of each lens unit respectively at a wide-angle limit, a middle position and a telephoto limit, in order from the top. In the part between the wide-angle limit and the middle position and the part between the middle position and the telephoto limit, the positions are connected simply with a straight line, and hence this line does not indicate actual motion of each lens unit.

In each Fig., an arrow imparted to a lens unit indicates focusing from an infinity in-focus condition to a close-object in-focus condition. That is, in FIGS. 1, 4 and 7, the arrow indicates a direction along which a fourth lens unit G4 described later moves in focusing from an infinity in-focus condition to a close-object in-focus condition.

Each of the zoom lens systems according to the embodiments, in order from the object side to the image side, comprises a first lens unit G1 having positive optical power, a second lens unit G2 having negative optical power, a third lens unit G3 having positive optical power, a fourth lens unit G4 having positive optical power, and a fifth lens unit G5 having negative optical power.

In zooming, the first to fourth lens units G1 to G4 individually move along the optical axis so that the intervals between the respective lens units, i.e., the interval between the first lens unit G1 and the second lens unit G2, the interval between the second lens unit G2 and the third lens unit G3, the interval between the third lens unit G3 and the fourth lens unit G4, and the interval between the fourth lens unit G4 and the fifth lens unit G5 vary. In the zoom lens system according to each embodiment, these lens units are arranged in a desired optical power allocation, whereby size reduction of the entire lens system is achieved while maintaining high optical performance.

In FIGS. 1, 4 and 7, an asterisk "*" imparted to a particular surface indicates that the surface is aspheric. In each Fig., symbol (+) or (−) imparted to the symbol of each lens unit corresponds to the sign of the optical power of the lens unit. In each Fig., the straight line located on the most right-hand side indicates the position of the image surface S. On the object side relative to the image surface S (between the image surface S and the most image side lens surface of the fifth lens unit G5), a plane parallel plate P equivalent to an optical low-pass filter or a face plate of an image sensor is provided.

Embodiment 1

As shown in FIG. 1, the first lens unit G1 comprises solely a bi-convex first lens element L1.

The second lens unit G2, in order from the object side to the image side, comprises: a negative meniscus second lens element L2 with the convex surface facing the object side; a bi-concave third lens element L3; and a positive meniscus fourth lens element L4 with the convex surface facing the object side. Among these, the second lens element L2 has two aspheric surfaces.

The third lens unit G3, in order from the object side to the image side, comprises: a bi-convex fifth lens element L5; a positive meniscus sixth lens element L6 with the convex surface facing the object side; a negative meniscus seventh lens element L7 with the convex surface facing the object side; a negative meniscus eighth lens element L8 with the convex surface facing the image side; and a bi-convex ninth lens element L9. Among these, the sixth lens element L6 and the seventh lens element L7 are cemented with each other. In the surface data of the corresponding Numerical Example described later, a surface number 12 is imparted to an adhesive layer between the sixth lens element L6 and the seventh lens element L7. The fifth lens element L5 has two aspheric surfaces, and the ninth lens element L9 has two aspheric surfaces.

In the third lens unit G3, an aperture diaphragm A is placed between the seventh lens element L7 and the eighth lens element L8.

The fourth lens unit G4 comprises solely a positive meniscus tenth lens element L10 with the convex surface facing the object side. The tenth lens element L10 has two aspheric surfaces.

The fifth lens unit G5 comprises solely a negative meniscus eleventh lens element L11 with the convex surface facing the image side. The eleventh lens element L11 has an aspheric object side surface.

In the zoom lens system according to Embodiment 1, in zooming from a wide-angle limit to a telephoto limit at the time of image taking, the first lens unit G1 moves to the object side with locus of a convex to the image side, the second lens unit G2 moves to the image side with locus of a convex to the image side, the third lens unit G3 substantially monotonically moves to the object side, the fourth lens unit G4 substantially monotonically and slightly moves to the object side, and the fifth lens unit G5 is fixed with respect to the image surface S. That is, in zooming, the first to fourth lens units G1 to G4 individually move along the optical axis so that the interval between the first lens unit G1 and the second lens unit G2 increases, the interval between the second lens unit G2 and the third lens unit G3 decreases, the interval between the third lens unit G3 and the fourth lens unit G4 increases, and the interval between the fourth lens unit G4 and the fifth lens unit G5 slightly increases.

In the zoom lens system according to Embodiment 1, in focusing from an infinity in-focus condition to a close-object in-focus condition, the fourth lens unit G4 moves to the object side along the optical axis.

Embodiment 2

As shown in FIG. 4, the first lens unit G1, in order from the object side to the image side, comprises: a bi-convex first lens element L1, and a negative meniscus second lens element L2 with the convex surface facing the image side. The first lens element L1 and the second lens element L2 are cemented with each other. In the surface data of the corresponding Numerical Example described later, a surface number 2 is imparted to an adhesive layer between the first lens element L1 and the second lens element L2. The second lens element L2 has an aspheric image side surface.

The second lens unit G2, in order from the object side to the image side, comprises: a negative meniscus third lens element L3 with the convex surface facing the object side; a bi-concave fourth lens element L4; and a positive meniscus fifth lens element L5 with the convex surface facing the object side. Among these, the third lens element L3 has two aspheric surfaces.

The third lens unit G3, in order from the object side to the image side, comprises: a bi-convex sixth lens element L6; a positive meniscus seventh lens element L7 with the convex surface facing the object side; a negative meniscus eighth lens element L8 with the convex surface facing the object side; a negative meniscus ninth lens element L9 with the convex surface facing the image side; and a bi-convex tenth lens element L10. Among these, the seventh lens element L7 and the eighth lens element L8 are cemented with each other. In the surface data of the corresponding Numerical Example described later, a surface number 14 is imparted to an adhesive layer between the seventh lens element L7 and the eighth lens element L8. The sixth lens element L6 has two aspheric surfaces, and the tenth lens element L10 has two aspheric surfaces.

In the third lens unit G3, an aperture diaphragm A is placed between the eighth lens element L8 and the ninth lens element L9.

The fourth lens unit G4 comprises solely a positive meniscus eleventh lens element L11 with the convex surface facing the object side. The eleventh lens element L11 has two aspheric surfaces.

The fifth lens unit G5 comprises solely a bi-concave twelfth lens element L12. The twelfth lens element L12 has an aspheric object side surface.

In the zoom lens system according to Embodiment 2, in zooming from a wide-angle limit to a telephoto limit at the time of image taking, the first lens unit G1 moves to the object side with locus of a convex to the image side, the second lens unit G2 moves to the image side with locus of a convex to the image side, the third lens unit G3 substantially monotonically moves to the object side, the fourth lens unit G4 substantially monotonically and slightly moves to the object side, and the fifth lens unit G5 is fixed with respect to the image surface S. That is, in zooming, the first to fourth lens units G1 to G4 individually move along the optical axis so that the interval between the first lens unit G1 and the second lens unit G2 increases, the interval between the second lens unit G2 and the third lens unit G3 decreases, the interval between the third lens unit G3 and the fourth lens unit G4 increases, and the interval between the fourth lens unit G4 and the fifth lens unit G5 slightly increases.

In the zoom lens system according to Embodiment 2, in focusing from an infinity in-focus condition to a close-object in-focus condition, the fourth lens unit G4 moves to the object side along the optical axis.

Embodiment 3

As shown in FIG. 7, the first lens unit G1, in order from the object side to the image side, comprises: a plano-convex first lens element L1 with the convex surface facing the object side; and a meniscus second lens element L2 with the convex surface facing the image side.

The second lens unit G2, in order from the object side to the image side, comprises: a negative meniscus third lens element L3 with the convex surface facing the object side; a bi-concave fourth lens element L4; and a positive meniscus fifth lens element L5 with the convex surface facing the object side. Among these, the third lens element L3 has two aspheric surfaces.

The third lens unit G3, in order from the object side to the image side, comprises: a bi-convex sixth lens element L6; a positive meniscus seventh lens element L7 with the convex surface facing the object side; a negative meniscus eighth lens element L8 with the convex surface facing the object side; a negative meniscus ninth lens element L9 with the convex surface facing the image side; and a bi-convex tenth lens element L10. Among these, the seventh lens element L7 and the eighth lens element L8 are cemented with each other. In the surface data of the corresponding Numerical Example described later, a surface number 14 is imparted to an adhesive layer between the seventh lens element L7 and the eighth lens element L8. The sixth lens element L6 has two aspheric surfaces, and the tenth lens element L10 has two aspheric surfaces.

In the third lens unit G3, an aperture diaphragm A is placed between the eighth lens element L8 and the ninth lens element L9.

The fourth lens unit G4 comprises solely a positive meniscus eleventh lens element L11 with the convex surface facing the object side. The eleventh lens element L11 has two aspheric surfaces.

The fifth lens unit G5 comprises solely a negative meniscus twelfth lens element L12 with the convex surface facing the image side. The twelfth lens element L12 has an aspheric object side surface.

In the zoom lens system according to Embodiment 3, in zooming from a wide-angle limit to a telephoto limit at the time of image taking, the first lens unit G1 moves to the object side with locus of a convex to the image side, the second lens unit G2 moves to the image side with locus of a convex to the image side, the third lens unit G3 substantially monotonically moves to the object side, the fourth lens unit G4 substantially monotonically and slightly moves to the object side, and the fifth lens unit G5 is fixed with respect to the image surface S. That is, in zooming, the first to fourth lens units G1 to G4 individually move along the optical axis so that the interval between the first lens unit G1 and the second lens unit G2 increases, the interval between the second lens unit G2 and the third lens unit G3 decreases, the interval between the third lens unit G3 and the fourth lens unit G4 increases, and the interval between the fourth lens unit G4 and the fifth lens unit G5 slightly increases.

In the zoom lens system according to Embodiment 3, in focusing from an infinity in-focus condition to a close-object in-focus condition, the fourth lens unit G4 moves to the object side along the optical axis.

In the zoom lens systems according to Embodiments 1 to 3, since the first lens unit G1 is composed of two or less lens elements, sufficient size reduction can be achieved.

In the zoom lens systems according to Embodiments 1 to 3, since the third lens unit G3 is composed of at least two lens elements, specifically, five lens elements, it is possible to realize a compact, high-resolution, and high-performance zoom lens system which is bright due to the small F-number from the wide-angle limit to the telephoto limit, and in which occurrences of various aberrations are sufficiently suppressed.

In the zoom lens systems according to Embodiments 1 to 3, as described above, the third lens unit G3 is composed of at least two lens elements, and the aperture diaphragm A is placed between two lens elements among the lens elements constituting the third lens unit G3. Therefore, it is possible to realize a compact, high-resolution, and high-performance zoom lens system which is bright due to the small F-number from the wide-angle limit to the telephoto limit, and in which occurrences of various aberrations are sufficiently suppressed.

In the zoom lens systems according to Embodiments 1 to 3, a sub lens unit corresponding to a part of the third lens unit G3 is an image blur compensating lens unit which is configured to be movable in a direction perpendicular to the optical axis to optically compensate for image blur. By moving the image blur compensating lens unit in the direction perpendicular to the optical axis, image point movement caused by vibration of the entire system can be compensated. That is, image blur caused by hand blurring, vibration and the like can be optically compensated.

When compensating for the image point movement caused by vibration of the entire system, the image blur compensating lens unit moves in the direction perpendicular to the optical axis. Thereby, image blur can be compensated in a state that size increase in the entire zoom lens system is suppressed to realize a compact configuration and that excellent imaging characteristics such as small decentering coma aberration and small decentering astigmatism are satisfied.

The sub lens unit corresponding to a part of the third lens unit G3 indicates any one lens element or a plurality of adjacent lens elements among the plurality of lens elements constituting the third lens unit G3.

As described above, Embodiments 1 to 3 have been described as examples of art disclosed in the present application. However, the art in the present disclosure is not limited to these embodiments. It is understood that various modifications, replacements, additions, omissions, and the like have been performed in these embodiments to give optional embodiments, and the art in the present disclosure can be applied to the optional embodiments.

The following description is given for conditions that a zoom lens system like the zoom lens systems according to Embodiments 1 to 3 can satisfy. Here, a plurality of beneficial conditions is set forth for the zoom lens system according to each embodiment. A construction that satisfies all the plurality of conditions is most beneficial for the zoom lens system. However, when an individual condition is satisfied, a zoom lens system having the corresponding effect is obtained.

For example, in a zoom lens system, like the zoom lens systems according to Embodiments 1 to 3, which includes a plurality of lens units each being composed of at least one lens element, and comprises, in order from the object side to the image side, a first lens unit having positive optical power, a second lens unit having negative optical power, a third lens unit having positive optical power, a fourth lens unit having positive optical power, and a fifth lens unit having negative optical power, in which the first lens unit is composed of two or less lens elements, and the third lens unit is composed of five or more lens elements (hereinafter, this lens configuration is referred to as a basic configuration I of the embodiments), or in a zoom lens system, like the zoom lens systems according to Embodiments 1 to 3, which includes a plurality of lens units each being composed of at least one lens element, and comprises, in order from the object side to the image side, a first lens unit having positive optical power, a second lens unit having negative optical power, a third lens unit having positive optical power, a fourth lens unit having positive optical power, and a fifth lens unit having negative optical power, in which the first lens unit is composed of two or less lens elements, the third lens unit is composed of at least two lens elements, and an aperture diaphragm is placed between two lens elements among the lens elements constituting the third lens unit (hereinafter, this lens configuration is referred to as a basic configuration II of the embodiments), the following condition (1) is satisfied:

$$5.0 < f_1/f_3 < 8.0 \qquad (1)$$

where
$f_1$ is the focal length of the first lens unit, and
$f_3$ is the focal length of the third lens unit.

The condition (1) sets forth a ratio between the focal length of the first lens unit and the focal length of the third lens unit. When the value goes below the lower limit of the condition (1), the focal length of the first lens unit becomes excessively short relative to the focal length of the third lens unit, which makes it difficult to suppress occurrences of various aberrations such as chromatic aberration. When the value exceeds the upper limit of the condition (1), the focal length of the third lens unit becomes excessively short, which makes it difficult to suppress occurrences of various aberrations such as spherical aberration.

When at least one of the following conditions (1)' and (1)" is satisfied, the above-mentioned effect is achieved more successfully.

$$6.0 < f_1/f_3 \qquad (1)'$$

$$f_1/f_3 < 7.0 \qquad (1)''$$

For example, it is beneficial for a zoom lens system having the basic configuration I or a zoom lens system having the basic configuration II, like the zoom lens systems according to Embodiments 1 to 3, to satisfy the following condition (2):

$$1.0 < D_3/D_1 < 10.0 \qquad (2)$$

where
$D_1$ is the optical axial thickness of the first lens unit, and
$D_3$ is the optical axial thickness of the third lens unit.

The condition (2) sets forth a ratio between the optical axial thickness of the third lens unit and the optical axial thickness of the first lens unit. When the value goes below the lower limit of the condition (2), the thickness of the third lens unit becomes excessively small, which makes it difficult to suppress occurrences of various aberrations such as spherical aberration and coma aberration. When the value exceeds the upper limit of the condition (2), the thickness of the third lens unit becomes excessively large relative to the thickness of the first lens unit, which makes it difficult to achieve size reduction that has recently been required of digital cameras.

When at least one of the following conditions (2)' and (2)" is satisfied, the above-mentioned effect is achieved more successfully.

$$2.5 < D_3/D_1 \qquad (2)'$$

$$D_3/D_1 < 8.0 \qquad (2)''$$

For example, it is beneficial for a zoom lens system having the basic configuration I or a zoom lens system having the basic configuration II, like the zoom lens systems according to Embodiments 1 to 3, to satisfy the following condition (3):

$$-15.0 < f_5/f_W < -3.0 \qquad (3)$$

where
$f_5$ is the focal length of the fifth lens unit, and
$f_W$ is the focal length of the zoom lens system at the wide-angle limit.

The condition (3) sets forth a ratio between the focal length of the fifth lens unit and the focal length of the entire zoom lens system at the wide-angle limit. When the value goes below the lower limit of the condition (3), the focal length of the fifth lens unit becomes excessively long, and thereby the absolute optical power of the fifth lens unit is reduced. As a result, the effect of suppressing occurrences of aberrations in the fifth lens unit is reduced, which makes it difficult to achieve size reduction. When the value exceeds the upper limit of the condition (3), the focal length of the fifth lens unit becomes excessively short relative to the focal length of the entire zoom lens system at the wide-angle limit, and thereby the absolute optical power of the fifth lens unit is increased. As a result, it becomes difficult to suppress occurrences of various aberrations such as curvature of field.

When at least one of the following conditions (3)' and (3)" is satisfied, the above-mentioned effect is achieved more successfully.

$$-11.0 < f_5/f_W \qquad (3)'$$

$$f_5/f_W < -6.0 \qquad (3)''$$

Each of the lens units constituting the zoom lens systems according to Embodiments 1 to 3 is composed exclusively of refractive type lens elements that deflect the incident light by refraction (that is, lens elements of a type in which deflection is achieved at the interface between media each having a distinct refractive index). However, the present disclosure is not limited to this. For example, the lens units may employ diffractive type lens elements that deflect the incident light by diffraction; refractive-diffractive hybrid type lens elements that deflect the incident light by a combination of diffraction and refraction; or gradient index type lens elements that deflect the incident light by distribution of refractive index in the medium. In particular, in the refractive-diffractive hybrid type lens elements, when a diffraction structure is formed in the interface between media having mutually different refractive indices, wavelength dependence in the diffraction efficiency is improved.

Moreover, in each embodiment, a configuration has been described that on the object side relative to the image surface S (between the image surface S and the most image side lens surface of the fifth lens unit G5), a plane parallel plate P such as an optical low-pass filter and a face plate of an image sensor is provided. This low-pass filter may be: a birefringent type low-pass filter made of, for example, a crystal whose predetermined crystal orientation is adjusted; or a phase type low-pass filter that achieves desired characteristics of optical cut-off frequency by diffraction.

Embodiment 4

Figure 10:
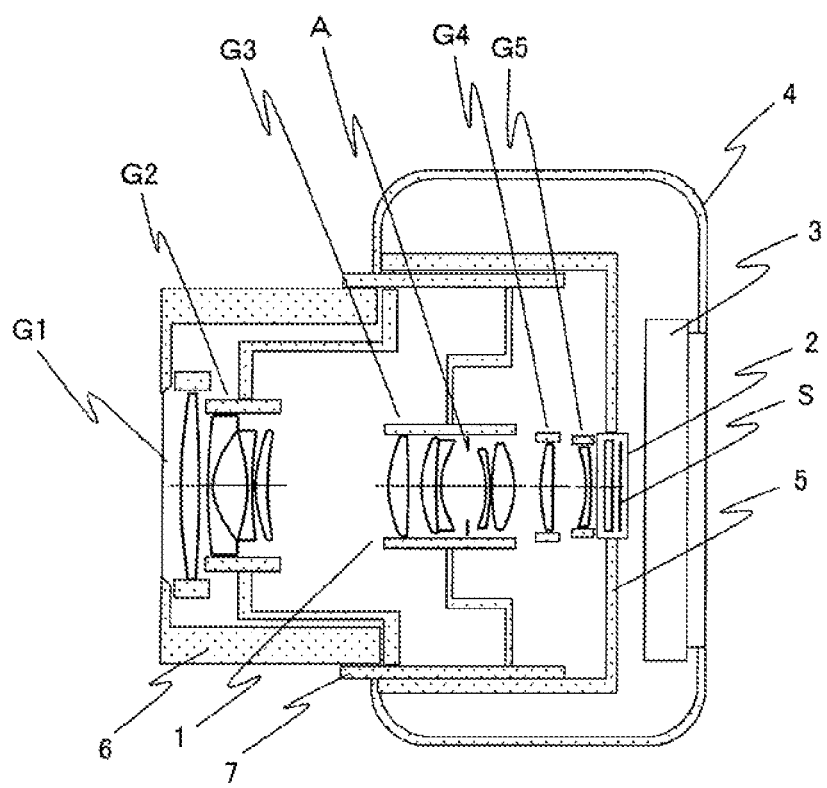
FIG. 10 is a schematic configuration diagram of a digital still camera system according to Embodiment 4.

FIG. 10 is a schematic configuration diagram of a digital still camera according to Embodiment 4. In FIG. 10, the digital still camera comprises: an imaging device having a zoom lens system 1 and an image sensor 2 composed of a CCD; a liquid crystal display monitor 3; and a body 4. The employed zoom lens system 1 is a zoom lens system according to Embodiment 1. In FIG. 10, the zoom lens system 1, in order from the object side to the image side, comprises a first lens unit G1, a second lens unit G2, a third lens unit G3 including an aperture diaphragm A, a fourth lens unit G4, and a fifth lens unit G5. In the body 4, the zoom lens system 1 is arranged on the front side, while the image sensor 2 is arranged on the rear side of the zoom lens system 1. On the rear side of the body 4, the liquid crystal display monitor 3 is arranged, while an optical image of a photographic object generated by the zoom lens system 1 is formed on an image surface S.

The lens barrel comprises a main barrel 5, a moving barrel 6 and a cylindrical cam 7. When the cylindrical cam 7 is rotated, the first lens unit G1, the second lens unit G2, the third lens unit G3 including the aperture diaphragm A, the fourth lens unit G4, and the fifth lens unit G5 move to predetermined positions relative to the image sensor 2, so that zooming from a wide-angle limit to a telephoto limit is achieved. The fourth lens unit G4 is movable in an optical axis direction by a motor for focus adjustment.

As such, when the zoom lens system according to Embodiment 1 is employed in a digital still camera, a small digital still camera is obtained that has a high resolution and high capability of compensating the curvature of field and that has a short overall length of lens system at the time of non-use. Here, in the digital still camera shown in FIG. 10, the zoom lens system according to Embodiment 2 or 3 may be employed in place of the zoom lens system according to Embodiment 1. Further, the optical system of the digital still camera shown in FIG. 10 is applicable also to a digital video camera for moving images. In this case, moving images with high resolution can be acquired in addition to still images.

Here, the digital still camera according to the present Embodiment 4 has been described for a case that the employed zoom lens system 1 is a zoom lens system according to Embodiments 1 to 3. However, in these zoom lens systems, the entire zooming range need not be used. That is, in accordance with a desired zooming range, a range where satisfactory optical performance is obtained may exclusively be used. Then, the zoom lens system may be used as one having a lower magnification than the zoom lens system described in Embodiments 1 to 3.

Further, Embodiment 4 has been described for a case that the zoom lens system is applied to a lens barrel of so-called barrel retraction construction. However, the present disclosure is not limited to this. For example, the zoom lens system may be applied to a lens barrel of so-called bending configuration where a prism having an internal reflective surface or a front surface reflective mirror is arranged at an arbitrary position within the first lens unit G1 or the like. Further, in Embodiment 4, the zoom lens system may be applied to a so-called sliding lens barrel in which a part of the lens units constituting the zoom lens system like the entirety of the second lens unit G2, the entirety of the third lens unit G3, a part of the second lens unit G2, or a part of the third lens unit G3 is caused to escape from the optical axis at the time of barrel retraction.

An imaging device comprising a zoom lens system according to Embodiments 1 to 3, and an image sensor such as a CCD or a CMOS may be applied to a camera for a mobile terminal device such as a smart-phone, a surveillance camera in a surveillance system, a Web camera, a vehicle-mounted camera or the like.

As described above, Embodiment 4 has been described as an example of art disclosed in the present application. However, the art in the present disclosure is not limited to this embodiment. It is understood that various modifications, replacements, additions, omissions, and the like have been performed in this embodiment to give optional embodiments, and the art in the present disclosure can be applied to the optional embodiments.

Numerical examples are described below in which the zoom lens systems according to Embodiments 1 to 3 are implemented. Here, in the numerical examples, the units of length are all "mm", while the units of view angle are all "°". Moreover, in the numerical examples, r is the radius of curvature, d is the axial distance, nd is the refractive index to the d-line, and vd is the Abbe number to the d-line. In the numerical examples, the surfaces marked with * are aspherical surfaces, and the aspherical surface configuration is defined by the following expression.

$$Z = \frac{h^2/r}{1 + \sqrt{1-(1+\kappa)(h/r)^2}} + \sum A_n h^n$$

Here, the symbols in the formula indicate the following quantities.

Z is a distance from a point on an aspherical surface at a height h relative to the optical axis to a tangential plane at the vertex of the aspherical surface, h is a height relative to the optical axis, r is a radius of curvature at the top, κ is a conic constant, and $A_n$ is a n-th order aspherical coefficient.

Figure 2:
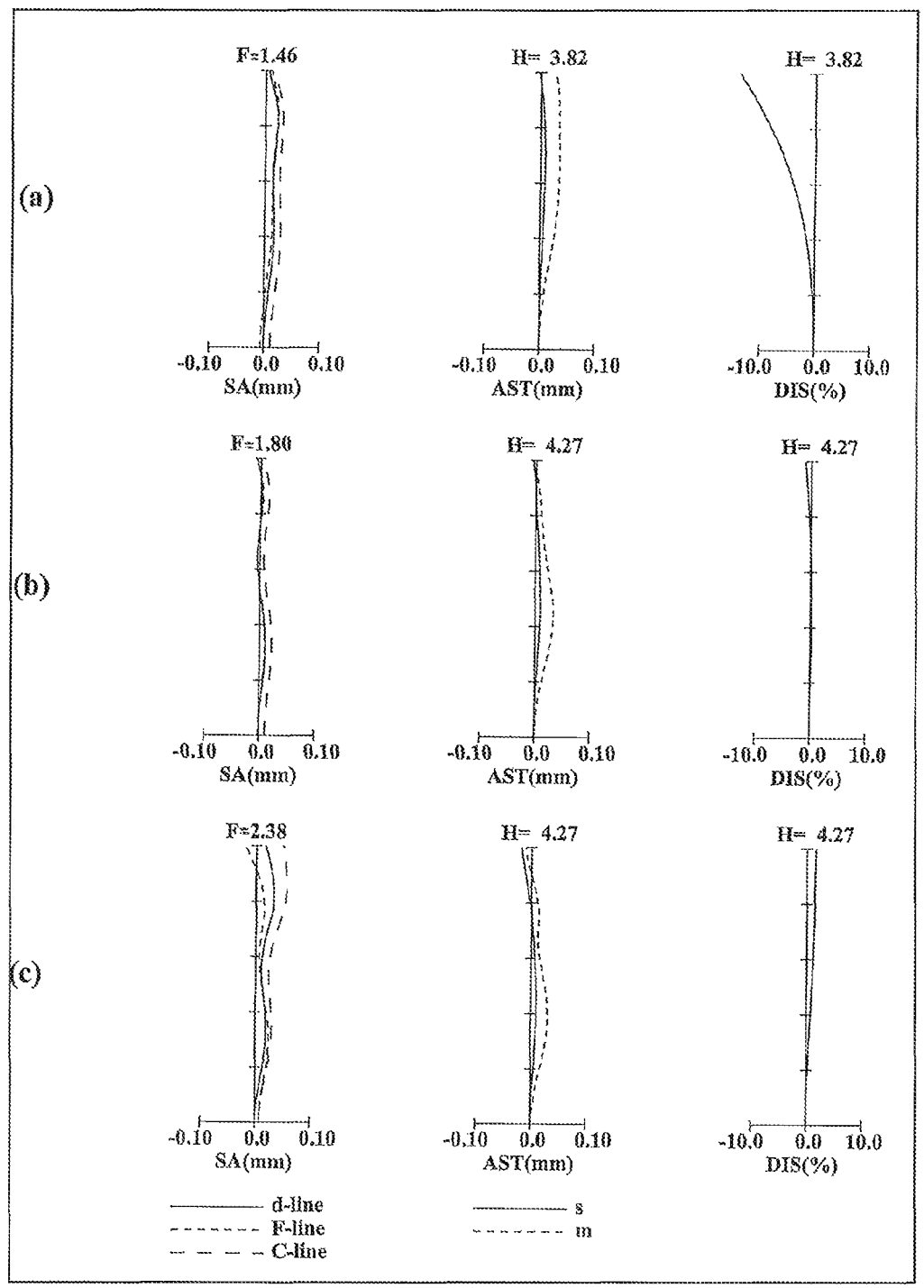
FIG. 2 is a longitudinal aberration diagram showing an infinity in-focus condition of the zoom lens system according to Numerical Example 1.
Figure 5:
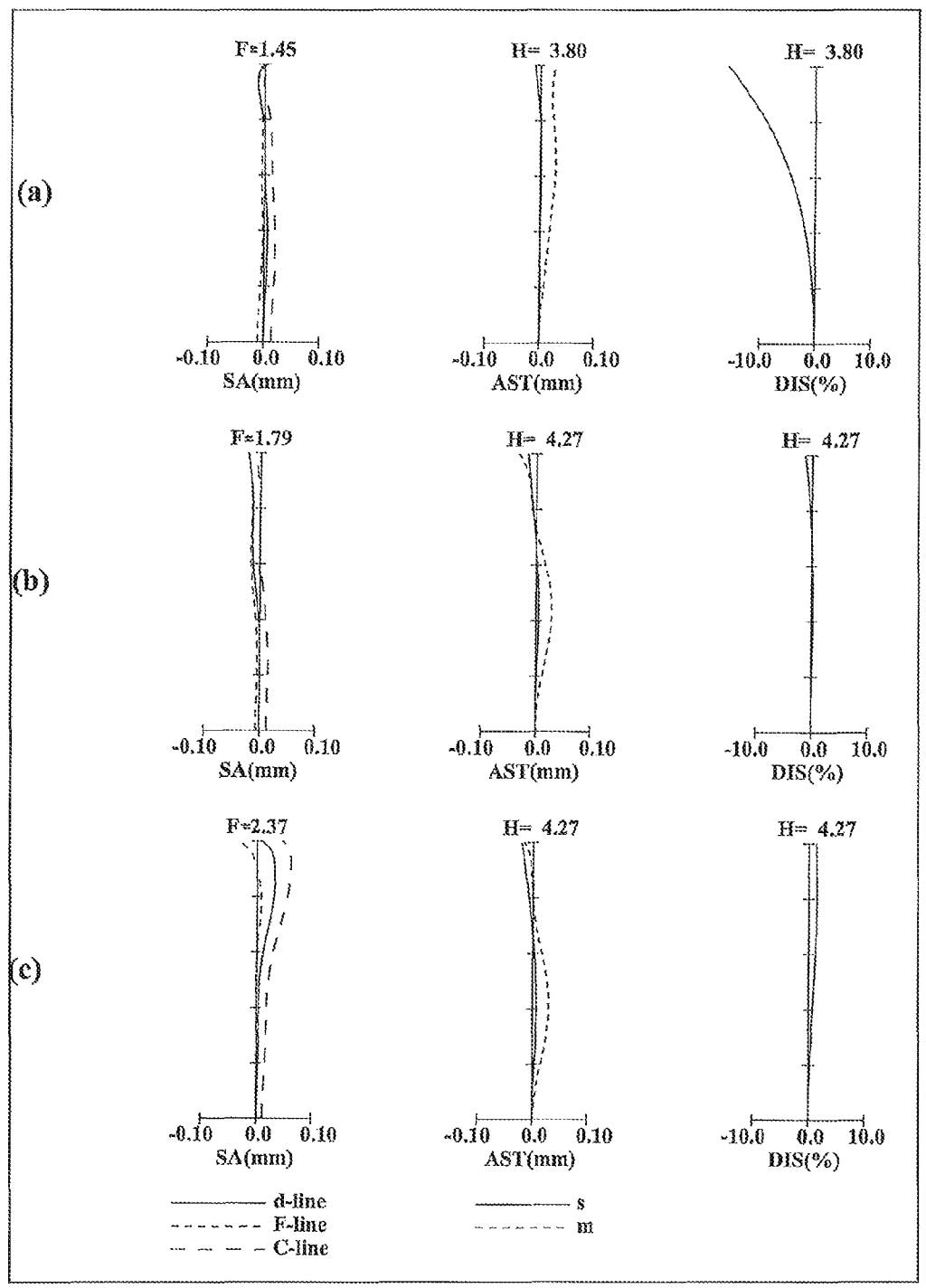
FIG. 5 is a longitudinal aberration diagram showing an infinity in-focus condition of the zoom lens system according to Numerical Example 2.
Figure 8:
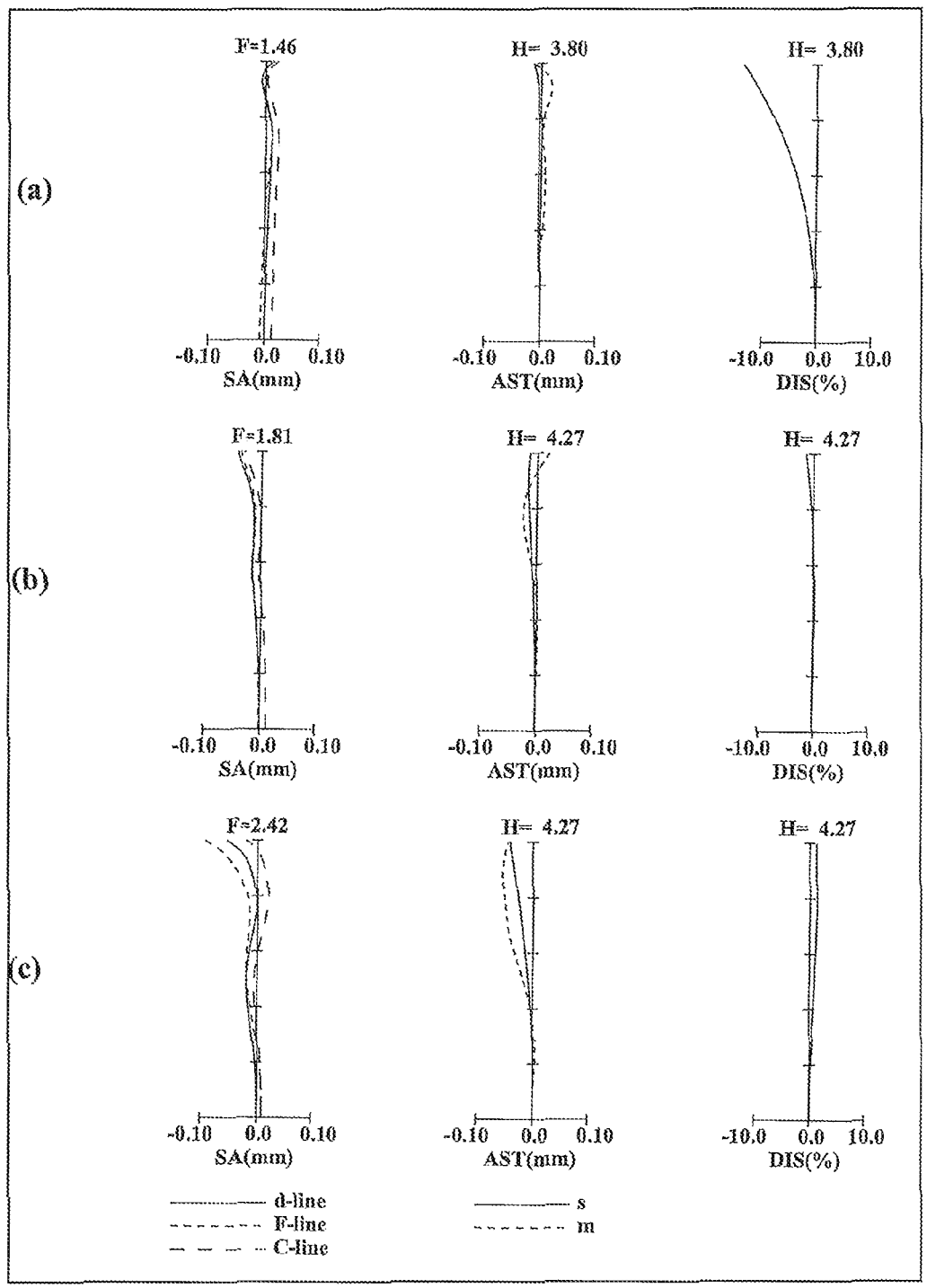
FIG. 8 is a longitudinal aberration diagram showing an infinity in-focus condition of the zoom lens system according to Numerical Example 3.

FIGS. 2, 5 and 8 are longitudinal aberration diagrams of the zoom lens systems according to Numerical Examples 1 to 3, respectively.

In each longitudinal aberration diagram, part (a) shows the aberration at a wide-angle limit, part (b) shows the aberration at a middle position, and part (c) shows the aberration at a telephoto limit. Each longitudinal aberration diagram, in order from the left-hand side, shows the spherical aberration (SA (mm)), the astigmatism (AST (mm)) and the distortion (DIS (%)). In each spherical aberration diagram, the vertical axis indicates the F-number (in each Fig., indicated as F), and the solid line, the short dash line and the long dash line indicate the characteristics to the d-line, the F-line and the C-line, respectively. In each astigmatism diagram, the vertical axis indicates the image height (in each Fig., indicated as H), and the solid line and the dash line indicate the characteristics to the sagittal plane (in each Fig., indicated as "s") and the meridional plane (in each Fig., indicated as "m"), respectively. In each distortion diagram, the vertical axis indicates the image height (in each Fig., indicated as H).

Figure 3:
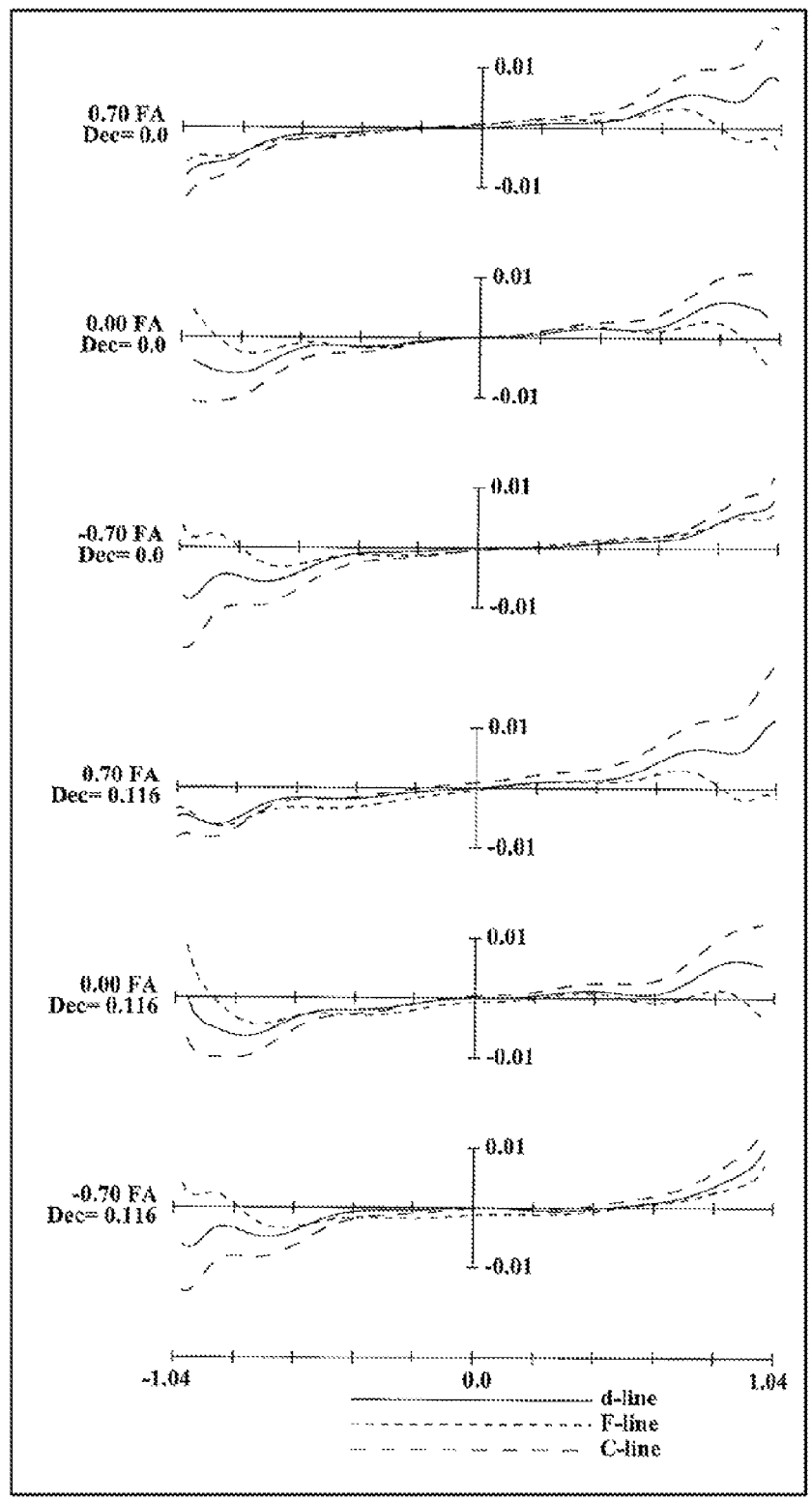
FIG. 3 is a lateral aberration diagram in a basic state where image blur compensation is not performed and in an image blur compensation state at a telephoto limit of the zoom lens system according to Numerical Example 1.
Figure 6:
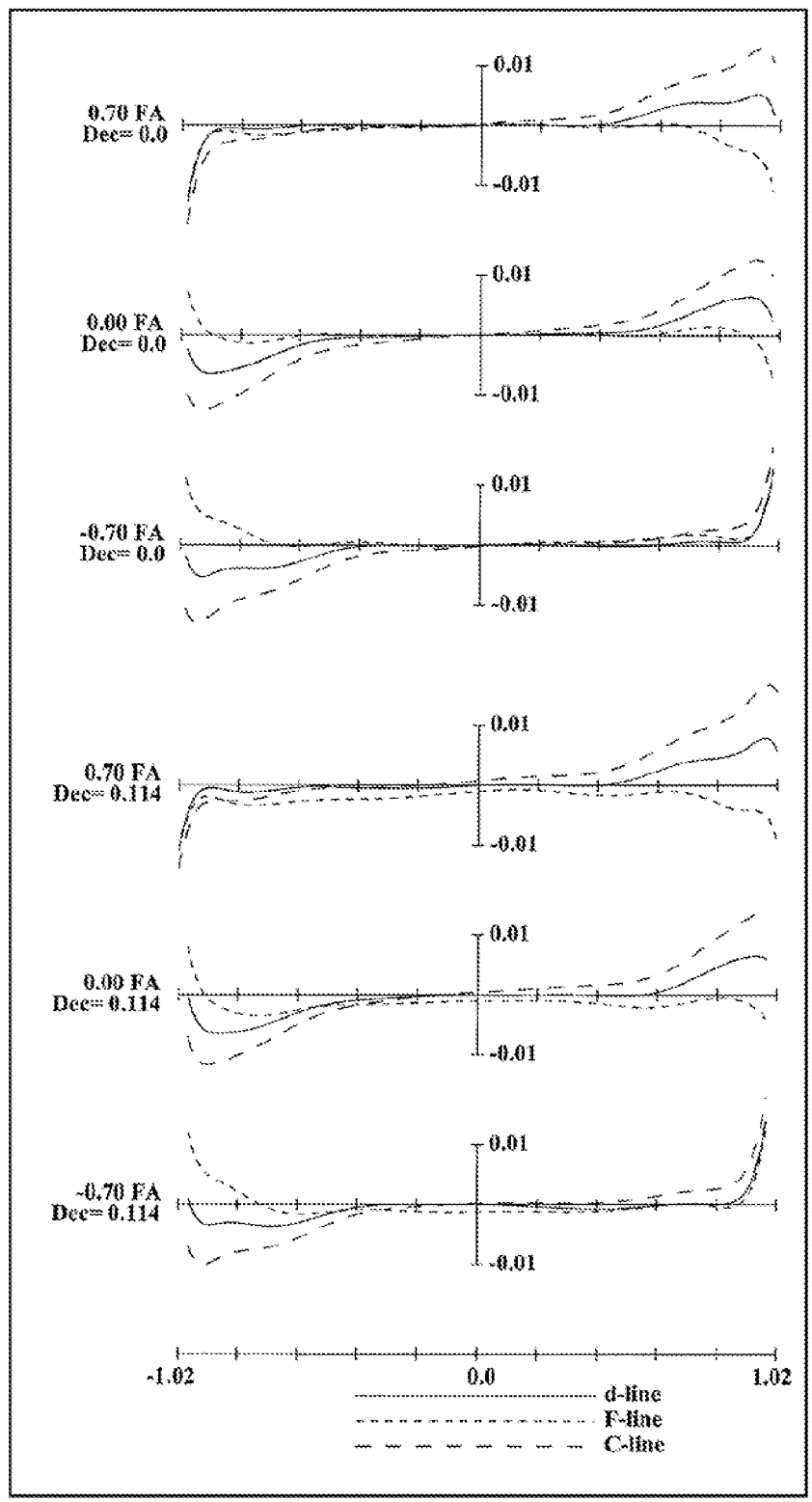
FIG. 6 is a lateral aberration diagram in a basic state where image blur compensation is not performed and in an image blur compensation state at a telephoto limit of the zoom lens system according to Numerical Example 2.
Figure 9:
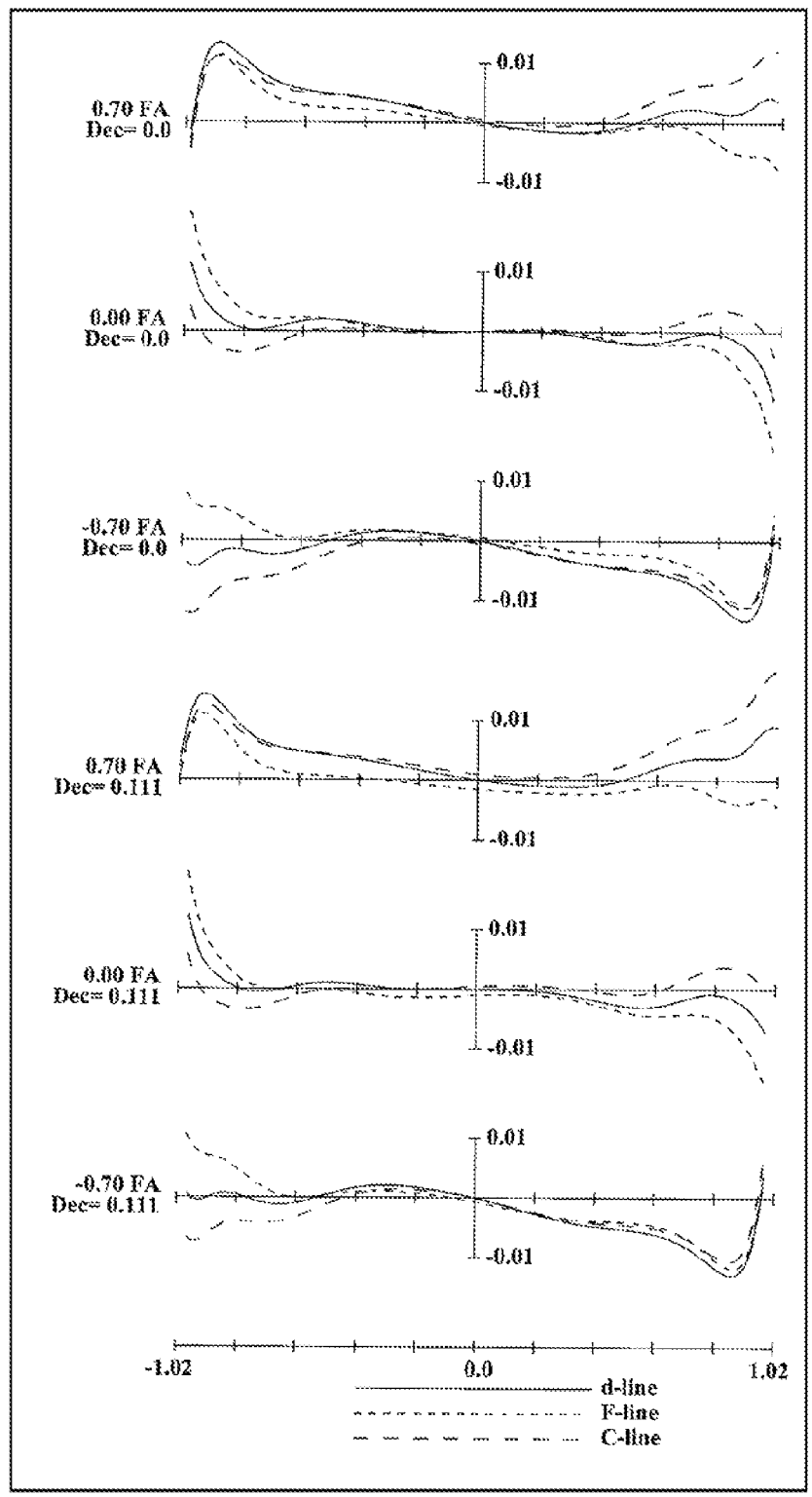
FIG. 9 is a lateral aberration diagram in a basic state where image blur compensation is not performed and in an image blur compensation state at a telephoto limit of the zoom lens system according to Numerical Example 3.

FIGS. 3, 6 and 9 are lateral aberration diagrams of the zoom lens systems at a telephoto limit according to Numerical Examples 1 to 3, respectively.

In each lateral aberration diagram, the aberration diagrams in the upper three parts correspond to a basic state where image blur compensation is not performed at a telephoto limit, while the aberration diagrams in the lower three parts correspond to an image blur compensation state where the image blur compensating lens unit (Numerical Example 1: the eighth lens element L8, Numerical Examples 2 and 3: the ninth lens element L9) is moved by a predetermined amount in a direction perpendicular to the optical axis at a telephoto limit. Among the lateral aberration diagrams of a basic state, the upper part shows the lateral aberration at an image point of 70% of the maximum image height, the middle part shows the lateral aberration at the axial image point, and the lower part shows the lateral aberration at an image point of −70% of the maximum image height. Among the lateral aberration diagrams of an image blur compensation state, the upper part shows the lateral aberration at an image point of 70% of the maximum image height, the middle part shows the lateral aberration at the axial image point, and the lower part shows the lateral aberration at an image point of −70% of the maximum image height. In each lateral aberration diagram, the horizontal axis indicates the distance from the principal ray on the pupil surface, and the solid line, the short dash line, and the long dash line indicate the characteristics to the d-line, the F-line, and the C-line, respectively. In each lateral aberration diagram, the meridional plane is adopted as the plane containing the optical axis of the first lens unit G1 and the optical axis of the third lens unit G3.

Here, in the zoom lens system according to each example, the amount of movement of the image blur compensating lens unit in a direction perpendicular to the optical axis in an image blur compensation state at a telephoto limit is as follows.

| | |
|---|---|
| Numerical Example 1 | 0.116 mm |
| Numerical Example 2 | 0.114 mm |
| Numerical Example 3 | 0.111 mm |

Here, when the shooting distance is infinity, at a telephoto limit, the amount of image decentering in a case that the zoom lens system inclines by 0.3° is equal to the amount of image decentering in a case that the image blur compensating lens unit displaces in parallel by each of the above-mentioned values in a direction perpendicular to the optical axis.

As seen from the lateral aberration diagrams, satisfactory symmetry is obtained in the lateral aberration at the axial image point. Further, when the lateral aberration at the +70% image point and the lateral aberration at the −70% image point are compared with each other in the basic state, all have a small degree of curvature and almost the same inclination in the aberration curve. Thus, decentering coma aberration and decentering astigmatism are small. This indicates that sufficient imaging performance is obtained even in the image blur compensation state. Further, when the image blur compensation angle of a zoom lens system is the same, the amount of parallel translation required for image blur compensation decreases with decreasing focal length of the entire zoom lens system. Thus, at arbitrary zoom positions, sufficient image blur compensation can be performed for image blur compensation angles up to 0.3° without degrading the imaging characteristics.

Numerical Example 1

The zoom lens system of Numerical Example 1 corresponds to Embodiment 1 shown in FIG. 1. Table 1 shows the surface data of the zoom lens system of Numerical Example 1. Table 2 shows the aspherical data. Table 3 shows the various data.

TABLE 1

(Surface data)

| Surface number | r | d | nd | vd |
|---|---|---|---|---|
| Object surface | ∞ | | | |
| 1 | 113.44530 | 1.90000 | 1.83481 | 42.7 |
| 2 | −297.17450 | Variable | | |
| 3* | 111.98700 | 1.00000 | 1.80500 | 41.0 |
| 4* | 8.99380 | 5.68420 | | |
| 5 | −29.36480 | 0.50000 | 1.59282 | 68.6 |
| 6 | 69.21140 | 0.10000 | | |
| 7 | 23.45620 | 1.73000 | 2.00272 | 19.3 |
| 8 | 87.70880 | Variable | | |
| 9* | 12.03500 | 2.52000 | 1.60602 | 57.4 |
| 10* | −125.15440 | 1.73590 | | |
| 11 | 9.52880 | 1.88000 | 1.77250 | 49.6 |
| 12 | 56.28420 | 0.01000 | 1.56732 | 42.8 |
| 13 | 56.28420 | 0.30000 | 1.74077 | 27.8 |
| 14 | 6.92530 | 2.86000 | | |
| 15(Diaphragm) | ∞ | 1.70000 | | |
| 16 | −11.50300 | 0.40000 | 1.72825 | 28.3 |
| 17 | −35.50780 | 0.10000 | | |
| 18* | 18.96440 | 2.62230 | 1.55189 | 71.5 |
| 19* | −10.39640 | Variable | | |
| 20* | 16.18730 | 1.47000 | 1.68400 | 31.3 |
| 21* | 152.01740 | Variable | | |
| 22* | −14.54160 | 0.60000 | 1.63550 | 23.9 |
| 23 | −50.76670 | 0.40000 | | |
| 24 | ∞ | 0.90000 | 1.51680 | 64.2 |
| 25 | ∞ | (BF) | | |
| Image surface | ∞ | | | |

TABLE 2

(Aspherical data)

Surface No. 3

K = 0.00000E+00, A4 = −2.68650E−05, A6 = −2.19939E−08, A8 = 1.71056E−09
A10 = −1.61048E−11, A12 = 5.21813E−14, A14 = 0.00000E+00, A16 = 0.00000E+00

Surface No. 4

K = −1.43006E−01, A4 = −7.46957E−05, A6 = −4.34096E−07, A8 = −1.13634E−08
A10 = 1.73729E−10, A12 = −2.59994E−12, A14 = 0.00000E+00, A16 = 0.00000E+00

Surface No. 9

K = −9.84634E−02, A4 = −6.88003E−05, A6 = 1.27101E−06, A8 = −5.27801E−08
A10 = 1.03956E−09, A12 = 0.00000E+00, A14 = 0.00000E+00, A16 = 0.00000E+00

Surface No. 10

K = 0.00000E+00, A4 = 9.49723E−06, A6 = 9.67297E−07, A8 = −1.08421E−08
A10 = −2.16963E−10, A12 = 1.44910E−11, A14 = 0.00000E+00, A16 = 0.00000E+00

Surface No. 18

K = 0.00000E+00, A4 = −2.43602E−04, A6 = 6.65996E−06, A8 = −9.91789E−07
A10 = 4.96802E−08, A12 = −1.47067E−09, A14 = 4.75724E−12, A16 = 0.00000E+00

Surface No. 19

K = 0.00000E+00, A4 = 5.29678E−05, A6 = −5.32716E−06, A8 = 8.32304E−07
A10 = −8.45390E−08, A12 = 3.34839E−09, A14 = −5.97550E−11, A16 = 0.00000E+00

Surface No. 20

K = 0.00000E+00, A4 = −2.21595E−04, A6 = 1.39952E−05, A8 = −1.04586E−06
A10 = 6.11792E−08, A12 = −1.38011E−09, A14 = −1.50683E−11, A16 = 1.00919E−12

Surface No. 21

K = 0.00000E+00, A4 = −2.80965E−04, A6 = 9.08046E−06, A8 = −3.10430E−07
A10 = 2.64379E−08, A12 = −7.01895E−10, A14 = −1.88682E−11, A16 = 1.10060E−12

Surface No. 22

K = 0.00000E+00, A4 = −7.92215E−04, A6 = 6.88113E−05, A8 = −2.88618E−06
A10 = 7.75972E−08, A12 = −8.87695E−10, A14 = −2.47039E−17, A16 = −1.82676E−19

TABLE 3

(Various data)

Zooming ratio 3.51904

| | Wide-angle limit | Middle position | Telephoto limit |
|---|---|---|---|
| Focal length | 4.8862 | 9.1227 | 17.1948 |
| F-number | 1.46326 | 1.79811 | 2.37854 |
| Half view angle | 42.1837 | 25.3081 | 13.7419 |
| Image height | 3.8210 | 4.2680 | 4.2680 |
| Overall length of lens system | 62.7990 | 57.9551 | 65.9945 |
| BF | 0.62702 | 0.64271 | 0.62527 |
| d2 | 0.3000 | 7.8855 | 17.2116 |
| d8 | 26.2611 | 9.4187 | 0.3234 |
| d19 | 2.7795 | 6.4064 | 13.8846 |
| d21 | 4.4190 | 5.1894 | 5.5372 |

Zoom lens unit data

| Lens unit | Initial surface No. | Focal length |
|---|---|---|
| 1 | 1 | 98.55662 |
| 2 | 3 | −12.88330 |
| 3 | 9 | 16.03587 |
| 4 | 20 | 26.37004 |
| 5 | 22 | −32.27528 |

Numerical Example 2

The zoom lens system of Numerical Example 2 corresponds to Embodiment 2 shown in FIG. 4. Table 4 shows the surface data of the zoom lens system of Numerical Example 2. Table 5 shows the aspherical data. Table 6 shows the various data.

TABLE 4

(Surface data)

| Surface number | r | d | nd | vd |
|---|---|---|---|---|
| Object surface | ∞ | | | |
| 1 | 105.56550 | 2.00000 | 1.83481 | 42.7 |
| 2 | −150.00000 | 0.01000 | 1.56732 | 42.8 |
| 3 | −150.00000 | 1.00000 | 1.80500 | 41.0 |
| 4* | −393.75050 | Variable | | |
| 5* | 138.82960 | 1.00000 | 1.80500 | 41.0 |
| 6* | 8.89750 | 5.57000 | | |
| 7 | −27.50370 | 0.45000 | 1.59282 | 68.6 |
| 8 | 67.09500 | 0.15000 | | |
| 9 | 24.55710 | 1.80000 | 2.00272 | 19.3 |
| 10 | 142.09650 | Variable | | |
| 11* | 12.31450 | 2.57500 | 1.60602 | 57.4 |
| 12* | −111.20410 | 1.00000 | | |
| 13 | 9.35310 | 2.61500 | 1.77250 | 49.6 |
| 14 | 53.57800 | 0.01000 | 1.56732 | 42.8 |
| 15 | 53.57800 | 0.30000 | 1.74077 | 27.8 |
| 16 | 6.53150 | 2.86000 | | |
| 17(Diaphragm) | ∞ | 1.70000 | | |
| 18 | −11.62300 | 0.40000 | 1.75211 | 25.0 |

TABLE 4-continued (Surface data)

| Surface number | r | d | nd | vd |
|---|---|---|---|---|
| 19 | −33.45890 | 0.15000 | | |
| 20* | 18.12450 | 2.51000 | 1.55189 | 71.5 |
| 21* | −10.40290 | Variable | | |
| 22* | 14.12540 | 1.40000 | 1.63450 | 23.9 |
| 23* | 57.61790 | Variable | | |
| 24* | −34.85510 | 0.60000 | 1.63450 | 23.9 |
| 25 | 353.95920 | 0.40000 | | |
| 26 | ∞ | 0.90000 | 1.51680 | 64.2 |
| 27 | ∞ | (BF) | | |
| Image surface | ∞ | | | |

TABLE 5

(Aspherical data)

Surface No. 4

K = 0.00000E+00, A4 = 1.43776E−07, A6 = −1.51162E−09, A8 = 5.23347E−11
A10 = −3.78670E−13, A12 = 8.71391E−16, A14 = 0.00000E+00, A16 = 0.00000E+00

Surface No. 5

K = 0.00000E+00, A4 = −3.45713E−05, A6 = 2.53421E−08, A8 = 1.63760E−09
A10 = −1.75003E−11, A12 = 6.18789E−14, A14 = 0.00000E+00, A16 = 0.00000E+00

Surface No. 6

K = −1.62150E−01, A4 = −7.68132E−05, A6 = −9.78708E−07, A8 = 4.77805E−09
A10 = −9.32047E−11, A12 = −9.48778E−13, A14 = 0.00000E+00, A16 = 0.00000E+00

Surface No. 11

K = −1.27096E−01, A4 = −6.29003E−05, A6 = 1.52562E−06, A8 = −7.32547E−08
A10 = 1.73920E−09, A12 = −8.70142E−12, A14 = 0.00000E+00, A16 = 0.00000E+00

Surface No. 12

K = 0.00000E+00, A4 = 4.92469E−06, A6 = 1.34330E−06, A8 = −3.71399E−08
A10 = 5.09651E−10, A12 = 7.34850E−12, A14 = 0.00000E+00, A16 = 0.00000E+00

Surface No. 20

K = 0.00000E+00, A4 = −2.37428E−04, A6 = 8.45976E−07, A8 = −4.47191E−07
A10 = 2.22251E−08, A12 = −1.12689E−09, A14 = 4.24430E−12, A16 = 0.00000E+00

Surface No. 21

K = 0.00000E+00, A4 = 4.48928E−05, A6 = −2.62355E−06, A8 = 3.61470E−07
A10 = −5.75829E−08, A12 = 2.58409E−09, A14 = −5.77655E−11, A16 = 0.00000E+00

Surface No. 22

K = 0.00000E+00, A4 = −3.47958E−04, A6 = 4.96087E−05, A8 = −3.79526E−06
A10 = 1.74147E−07, A12 = −3.10481E−09, A14 = −1.47219E−11, A16 = 1.04795E−12

Surface No. 23

K = 0.00000E+00, A4 = −4.73304E−04, A6 = 5.72523E−05, A8 = −4.11121E−06
A10 = 1.82569E−07, A12 = −3.04917E−09, A14 = −1.77742E−11, A16 = 1.07427E−12

Surface No. 24

K = 0.00000E+00, A4 = −9.96949E−04, A6 = 5.99831E−05, A8 = −1.82488E−06
A10 = 3.52500E−08, A12 = −4.50624E−10, A14 = 2.22280E−12, A16 = 2.76460E−13

TABLE 6

(Various data)

Zooming ratio 3.50490

| | Wide-angle limit | Middle position | Telephoto limit |
|---|---|---|---|
| Focal length | 4.8416 | 9.0334 | 16.9694 |
| F-number | 1.45115 | 1.78939 | 2.36977 |
| Half view angle | 42.9872 | 25.5750 | 13.9373 |
| Image height | 3.8000 | 4.2680 | 4.2680 |
| Overall length of lens system | 63.8276 | 59.8964 | 67.2176 |
| BF | 0.64886 | 0.65737 | 0.63328 |
| d4 | 0.3000 | 8.5486 | 17.7370 |
| d10 | 26.6170 | 10.1991 | 1.0506 |
| d21 | 2.8868 | 6.5202 | 13.6584 |
| d23 | 3.9749 | 4.5711 | 4.7384 |

(Various data)

Zoom lens unit data

| Lens unit | Initial surface No. | Focal length |
|---|---|---|
| 1 | 1 | 98.78873 |
| 2 | 5 | −12.75939 |
| 3 | 11 | 15.74699 |
| 4 | 22 | 29.12856 |
| 5 | 24 | −49.97877 |

Numerical Example 3

The zoom lens system of Numerical Example 3 corresponds to Embodiment 3 shown in FIG. 7. Table 7 shows the surface data of the zoom lens system of Numerical Example 3. Table 8 shows the aspherical data. Table 9 shows the various data.

TABLE 7

(Surface data)

| Surface number | r | d | nd | vd |
|---|---|---|---|---|
| Objet surface | ∞ | | | |
| 1 | 87.28370 | 2.00000 | 1.83481 | 42.7 |
| 2 | ∞ | 2.00000 | | |
| 3 | −57.69780 | 1.00000 | 2.00272 | 19.3 |
| 4 | −57.69780 | Variable | | |
| 5* | 193.09420 | 1.00000 | 1.80500 | 41.0 |
| 6* | 8.80040 | 5.57000 | | |
| 7 | −27.61730 | 0.45000 | 1.59282 | 68.6 |
| 8 | 67.92100 | 0.15000 | | |
| 9 | 24.54810 | 1.80000 | 2.00272 | 19.3 |
| 10 | 143.95360 | Variable | | |
| 11* | 12.27760 | 2.57500 | 1.60602 | 57.4 |
| 12* | −113.00390 | 1.00000 | | |
| 13 | 9.35530 | 2.61500 | 1.77250 | 49.6 |
| 14 | 57.05800 | 0.01000 | 1.56732 | 42.8 |
| 15 | 57.05800 | 0.30000 | 1.74077 | 27.8 |
| 16 | 6.53150 | 2.86000 | | |
| 17(Diaphragm) | ∞ | 1.70000 | | |
| 18 | −11.57340 | 0.40000 | 1.75211 | 25.0 |
| 19 | −33.45890 | 0.15000 | | |
| 20* | 18.02520 | 2.51000 | 1.55189 | 71.5 |
| 21* | −10.40290 | Variable | | |
| 22* | 14.25850 | 1.40000 | 1.63450 | 23.9 |
| 23* | 59.48930 | Variable | | |
| 24* | −27.01400 | 0.60000 | 1.63450 | 23.9 |
| 25 | −502.05620 | 0.40000 | | |
| 26 | ∞ | 0.90000 | 1.51680 | 64.2 |
| 27 | ∞ | (BF) | | |
| Image surface | ∞ | | | |

TABLE 8

(Aspherical data)

Surface No. 5

K = 0.00000E+00, A4 = 1.12471E−05, A6 = −1.18640E−06, A8 = 2.02692E−08
A10 = −1.53299E−10, A12 = 4.37655E−13, A14 = 0.00000E+00, A16 = 0.00000E+00

Surface No. 6

K = −1.62150E−01, A4 = −4.88957E−05, A6 = −1.03058E−06, A8 = −3.03384E−08
A10 = 8.58848E−10, A12 = −8.15647E−12, A14 = 0.00000E+00, A16 = 0.00000E+00

Surface No. 11

K = −1.27096E−01, A4 = −5.99562E−05, A6 = 9.72357E−07, A8 = −4.93861E−08
A10 = 1.39167E−09, A12 = −8.38330E−12, A14 = 0.00000E+00, A16 = 0.00000E+00

Surface No. 12

K = 0.00000E+00, A4 = 5.32003E−06, A6 = 1.34310E−06, A8 = −3.72681E−08
A10 = 5.05101E−10, A12 = 7.28522E−12, A14 = 0.00000E+00, A16 = 0.00000E+00

Surface No. 20

K = 0.00000E+00, A4 = −2.36783E−04, A6 = 8.37421E−07, A8 = −4.47292E−07
A10 = 2.23025E−08, A12 = −1.12105E−09, A14 = 4.05464E−12, A16 = 0.00000E+00

Surface No. 21

K = 0.00000E+00, A4 = 4.41863E−05, A6 = −2.62991E−06, A8 = 3.60176E−07
A10 = −5.77158E−08, A12 = 2.58031E−09, A14 = −5.70568E−11, A16 = 0.00000E+00

Surface No. 22

K = 0.00000E+00, A4 = −3.45115E−04, A6 = 4.91855E−05, A8 = −3.80360E−06
A10 = 1.74204E−07, A12 = −3.09735E−09, A14 = −1.47484E−11, A16 = 1.00919E−12

Surface No. 23

K = 0.00000E+00, A4 = −4.74415E−04, A6 = 5.76420E−05, A8 = −4.11246E−06
A10 = 1.81982E−07, A12 = −3.07864E−09, A14 = −1.84697E−11, A16 = 1.10060E−12

Surface No. 24

K = 0.00000E+00, A4 = −9.33898E−04, A6 = 5.84471E−05, A8 = −1.79631E−06
A10 = 3.72635E−08, A12 = −4.16280E−10, A14 = −2.44329E−17, A16 = −1.81071E−19

TABLE 9

(Various data)

Zooming ratio 3.53006

| | Wide-angle limit | Middle position | Telephoto limit |
|---|---|---|---|
| Focal length | 4.8132 | 9.0093 | 16.9908 |
| F-number | 1.46489 | 1.81330 | 2.41774 |
| Half view angle | 42.3418 | 25.6529 | 13.9423 |
| Image height | 3.8000 | 4.2680 | 4.2680 |
| Overall length of lens system | 65.8960 | 62.0955 | 69.8009 |
| BF | 0.63756 | 0.65791 | 0.65915 |
| d4 | 0.3000 | 8.5486 | 17.7370 |
| d10 | 26.6170 | 10.1991 | 1.0506 |
| d21 | 2.9317 | 6.6245 | 13.9421 |
| d23 | 4.0198 | 4.6754 | 5.0221 |

Zoom lens unit data

| Lens unit | Initial surface No. | Focal length |
|---|---|---|
| 1 | 1 | 103.86715 |
| 2 | 5 | −12.41583 |
| 3 | 11 | 15.74578 |
| 4 | 22 | 29.20516 |
| 5 | 24 | −45.01844 |

The following Table 10 shows the corresponding values to the individual conditions in the zoom lens systems of each of Numerical Examples.

TABLE 10

(Values corresponding to conditions)

| | | Numerical Example | | |
|---|---|---|---|---|
| Condition | | 1 | 2 | 3 |
| (1) | $f_1/f_3$ | 6.15 | 6.27 | 6.60 |
| (2) | $D_3/D_1$ | 7.59 | 4.79 | 2.88 |
| (3) | $f_5/f_W$ | −6.61 | −10.32 | −9.35 |

The present disclosure is applicable to a digital input device, such as a digital camera, a camera for a mobile terminal device such as a smart-phone, a surveillance camera in a surveillance system, a Web camera or a vehicle-mounted camera. In particular, the present disclosure is applicable to a photographing optical system where high image quality is required like in a digital camera.

As described above, embodiments have been described as examples of art in the present disclosure. Thus, the attached drawings and detailed description have been provided.

Therefore, in order to illustrate the art, not only essential elements for solving the problems but also elements that are not necessary for solving the problems may be included in elements appearing in the attached drawings or in the detailed description. Therefore, such unnecessary elements should not be immediately determined as necessary elements because of their presence in the attached drawings or in the detailed description.

Further, since the embodiments described above are merely examples of art in the present disclosure, it is understood that various modifications, replacements, additions, omissions, and the like can be performed in the scope of the claims or in an equivalent scope thereof.

What is claimed is:

1. A zoom lens system,
in order from an object side to an image side, comprising:
a first lens unit having positive optical power;
a second lens unit having negative optical power;
a third lens unit having positive optical power;
a fourth lens unit having positive optical power; and
a fifth lens unit having negative optical power, wherein
the first lens unit is composed of two or less lens elements,
the third lens unit is composed of five lens elements, and
the following condition (1) is satisfied:

$$5.0 < f_1/f_3 < 8.0 \quad (1)$$

where
$f_1$ is a focal length of the first lens unit, and
$f_3$ is a focal length of the third lens unit.

2. The zoom lens system as claimed in claim 1, wherein the following condition (2) is satisfied:

$$1.0 < D_3/D_1 < 10.0 \quad (2)$$

where
$D_1$ is an optical axial thickness of the first lens unit, and
$D_3$ is an optical axial thickness of the third lens unit.

3. The zoom lens system as claimed in claim 1, wherein the following condition (3) is satisfied:

$$-15.0 < f_5/f_W < -3.0 \quad (3)$$

where
$f_5$ is a focal length of the fifth lens unit, and
$f_W$ is a focal length of the zoom lens system at a wide-angle limit.

4. An imaging device capable of outputting an optical image of an object as an electric image signal, comprising:
a zoom lens system that forms the optical image of the object; and
an image sensor that converts the optical image formed by the zoom lens system into the electric image signal, wherein
the zoom lens system is the zoom lens system as claimed in claim 1.

5. A camera for converting an optical image of an object into an electric image signal and then performing at least one of displaying and storing of the converted image signal, comprising:
an imaging device including a zoom lens system that forms the optical image of the object, and an image sensor that converts the optical image formed by the zoom lens system into the electric image signal, wherein
the zoom lens system is the zoom lens system as claimed in claim 1.

6. A zoom lens system,
in order from an object side to an image side, comprising:
a first lens unit having positive optical power;
a second lens unit having negative optical power;
a third lens unit having positive optical power;
a fourth lens unit having positive optical power; and
a fifth lens unit having negative optical power, wherein
the first lens unit is composed of two or less lens elements,
the third lens unit is composed of five lens elements, and
an aperture diaphragm is placed between two lens elements among the lens elements constituting the third lens unit, and
the following condition (1) is satisfied:

$$5.0 < f_1/f_3 < 8.0 \quad (1)$$

where
$f_1$ is a focal length of the first lens unit, and
$f_3$ is a focal length of the third lens unit.

7. The zoom lens system as claimed in claim 6, wherein the following condition (2) is satisfied:

$$1.0 < D_3/D_1 < 10.0 \quad (2)$$

where
$D_1$ is an optical axial thickness of the first lens unit, and
$D_3$ is an optical axial thickness of the third lens unit.

8. The zoom lens system as claimed in claim 6, wherein the following condition (3) is satisfied:

$$-15.0 < f_5/f_W < -3.0 \quad (3)$$

where
$f_5$ is a focal length of the fifth lens unit, and
$f_W$ is a focal length of the zoom lens system at a wide-angle limit.

9. An imaging device capable of outputting an optical image of an object as an electric image signal, comprising:
  a zoom lens system that forms the optical image of the object; and
  an image sensor that converts the optical image formed by the zoom lens system into the electric image signal, wherein
  the zoom lens system is the zoom lens system as claimed in claim 6.

10. A camera for converting an optical image of an object into an electric image signal and then performing at least one of displaying and storing of the converted image signal, comprising:
  an imaging device including a zoom lens system that forms the optical image of the object, and an image sensor that converts the optical image formed by the zoom lens system into the electric image signal, wherein
  the zoom lens system is the zoom lens system as claimed in claim 6.

* * * * *